3,316,150
STABLE SUSPENSIONS OF ACETYL SALICYLIC ACID
Marvin Faeges, 3806 Bainbridge Road, Cleveland Heights, Ohio 44118
No Drawing. Filed Feb. 26, 1964, Ser. No. 347,352
6 Claims. (Cl. 167—65)

This invention relates to a new and novel palitable liquid form of acetyl salicyclic acid, commonly called "aspirin," in a physical chemical system constructed so that the chemical integrity of the acetyl salicylic acid is unchanged.

Aspirin is used as an antipyretic, analgesic, and anti-rheumatic, in capsule and tablet form.

There are some anesthetic properties when applied locally, especially in the powder form, in tonsillitis, tonsillectomy and pharyngitis.

In ointment form it is effective in certain skin itching and skin diseases. "It is believed that the analgesia is due to the *unhydrolyzed* acetyl salicylic acid molecule." (Editorial appearing in 1947 Journal of Gastroenterology.)

Conducive to a better understanding of the invention it may be well to point out that aspirin as ordinarily used in tablet or capsule form is difficult for problem swallowers to take. Furthermore, the smaller dosages required in pediatric practice are often difficult to administer with accuracy when standard tablets have to be broken in halves or quarters. As a consequence, efforts have been made to liquify or dissolve the acetyl salicylic acid in a liquid carrier to provide a solution that can be more easily administered in these special cases.

All prior attempts to solve this problem involve processes that adulterate the pure acetyl salicylic acid with other chemicals so as to aid in solubilizing the acetyl salicylic acid.

For example: When acetyl salicylic acid powder, or crystals, is mixed with other powdered or crystalline drugs such as acetophenetidin, aminopyrine, amidopyrene, quinine, phenylsalicylate, chinconine, etc., in such proportions as 1:1, and others, a sticky mass is formed, indicating that there is a chemical reaction taking place between the acetyl salicylic acid and the other drugs. Upon gentle heating the reaction goes to completion to form a new liquid substance, which is a eutectic mixture.

This eutectic mixture is no longer pure acetyl salicylic acid, or an admixture of acetyl salicylic acid and the additive drug, but a *new substance* because the melting point is now far below the original melting points of either of the original pure chemical entities, which were solids at room temperature.

It is well known that the melting point of any pure substance, under a given pressure, is a constant. The melting point of any impure substance is generally lower than that of the pure substance; which explains the liquified state of such prior art acetyl salicylic acid mixtures at room temperature.

Acetyl salicylic acid in the presence of moisture or aqueous, or mono-hydroxy alcoholic solutions, gradually hydrolyzes into acetic and salicylic acids. Hydrolysis is hastened by heat, acids and alkalies. Acetates and citrates of the alkali metals increase the solubility of acetyl salicylic acid but do not prevent hydrolysis. At room temperature about ½ of the acetyl salicylic acid present is hydrolyzed after one week. Hydrolysis is retarded somewhat in solutions containing sucrose, which is sometimes added to render the solution more palitable.

In my new method, pure acetyl salicylic acid powder, USP, is not admixed with any other chemical substance, but put into a stabilized suspension, due to its minute particle size (approximately 100 microns) and chemical concentration, in pure glycerine U.S.P. (propanetriol) or propylene glycol N.F. (methylethylene glycol). This concentrated form depresses any chemical interchange between itself and the vehicle and gives rise to an almost neutral pH, non-polymerizing, fluid, stable and palitable preparation.

The primary object of my invention, accordingly, is to provide pure acetyl salicylic acid in a stabilized palitable fluid form that facilitates its administration in pediatrics, where small volumetric doses are used; in problem swallowing, involving patients that cannot take tablets or capsules; and in local applications, for its anesthetic analgesic properties when used externally against itching insect bites, etc., and internally, for its antipyretic analgesic effect in treating sore throats, tonsillitis, pharyngitis, and the like.

In preparing my invention it is to be understood that the following procedure is carried on with proper pharmaceutical technique, not allowing any untensils or chemical substances to be contaminated with any foreign substances. Iron and copper apparatus or storage tanks should be avoided, since the end product would be discolored toward the pink or violet side, due to interaction of the salicylate ions with Cu or Fe ions.

The first step is to screen U.S.P. acetyl salicylic acid powder through a 140 mesh screen made of either stainless-steel, bronze, or plastic. When passing the powder through the screen no direct pressure must be used to force the powder through. Only shaking or free vibrating action should be exerted, because the acetyl salicylic acid will begin to decompose if subjected to crushing pressure.

About 5% of the total powder will not pass through the screen, thus ridding the screened powder of all larger particles, and yielding a very fine powder having particles no larger than approximately 100 microns in diameter.

U.S.P. glycerin, that has been packaged in iron free containers, is then heated to about 180° F. in order to reduce its viscosity. Care should be taken not to overheat the glycerin, or it will begin to decompose.

In my product, I do not ordinarily use any flavoring substance, since the preparation has a natural citric-like taste, but, if a flavoring agent is desired it can be added at this point by mixing the glycerin into the flavoring substance with slight stirring, to keep down the amount of air that is beaten into the liquid.

If propylene glycol is used instead of glycerin it should not be heated above 150° F., because of its lower boiling point.

The resultant liquid is added to sodium saccharine, or other suitable sweetening agent such as cyclamate sodium.

In the preferred form, described here, sodium saccharine is used in the w./v. proportion of 130 milligrams saccharine per 30 cc. of glycerin, which yields a, neutral pH, sweet solution.

Then, the so sweetened glycerin solution, kept at 180° F., is added to the acetyl salicylic acid powder, in small amounts at a time, and with slow and constant light stirring. If the stirring is too rapid, air will be whipped into the mixture.

Each 8 to 10 gram unit of the acetyl salicylic acid powder is mixed with enough glycerin to yield 30 cc. of finished product, which is then allowed to cool to room temperature.

If 9.72 grams (150 grains) of acetyl salicylic acid is mixed with enough glycerin in a weight/volume proportion to yield 30 cc. of finished product, of smooth palitable nature, each 4 minims of fluid will contain 1¼ grains of acetyl salicylic acid, the normal pediatric dose; and 1 cc. will contain 5 grains of acetyl salicylic acid, the normal adult dose.

Undue pressure of homogenization should be avoided because it tends to increase decomposition and does not give a more uniform end product in this instance.

The stability of the so formed suspension is due to the small particle size (100 microns) of the acetyl salicylic acid, and the high viscosity of the glycerin at room temerature, together with the high w./v. concentration of approximately 1:3. The integrity of the acetyl salicylic acid is maintained over prolonged periods because each particle is coated with glycerin which protects the particles from any moisture present in the atmosphere and therefore prevents hydrolysis from occuring.

The finished product is packaged in glass, or suitable plastic bottles. Plastic bottles should be opaque, and glass bottles should have a light protective color, such as brown or blue.

The standardized dropper can be of glass or plastic with the suction top of the dropper made of high grade gum rubber, or a suitable non-reacting composition rubber. It is recommended that the dropper and its screw cap be packaged separately until the preparation is to be used for the first time, when the shipping cap can be discarded and the stopper and cap be used as the closure from then on.

The fact that each particle of the suspended acetyl salicylic acid is coated with sweetened glycerin, prevents the naturally bitter taste from being perceived before it passes from the mouth, and is swallowed.

I claim:
1. A pharmaceutic preparation consisting of a stable suspension of powdered acetylsalicylic acid U.S.P. mechanically dispersed in glycerin U.S.P. in a weight/volume proportion of approximately 8 to 10 grams of acetylsalicylic acid to yield 30 ml. of product.

2. A pharmaceutic preparation, as in claim 1, wherein the carrying vehicle is propylene glycol U.S.P.

3. A pharmaceutic preparation consisting of a stable suspension of powdered acetylsalicylic acid, of 100 micron and less particle size, mechanically dispersed in anhydrous glycerin in a weight/volume proportion of approximately 8 to 10 grams of acetylsalicylic acid to yield 30 ml. of product.

4. A pharmaceutic preparation, as in claim 3, wherein the carrying vehicle is anhydrous propylene glycol.

5. A pharmaceutic preparation consisting of a stable suspension of powdered acetylsalicylic acid U.S.P. mechanically dispersed in glycerin U.S.P. to yield a product having a weight/volume proportion of approximately 1:3.

6. A pharmaceutic preparation, as in claim 5, wherein the carrying vehicle is propylene glycol U.S.P.

References Cited by the Examiner

UNITED STATES PATENTS

| | | | |
|---|---|---|---|
| 1,787,924 | 1/1931 | L. Whorton | 167—65 |
| 2,070,240 | 2/1937 | S. Ruben | 167—65 |

OTHER REFERENCES

Remington's Practice of Pharmacy (1956), 11th ed. (Mack Publ. Co., Easton, Pa.), pp. 297, 635 and 637.

ALBERT T. MEYERS, *Primary Examiner.*

JULIAN S. LEVITT, SAM ROSEN, *Examiners.*

S. J. FRIEDMAN, M. J. COHEN, *Assistant Examiners.*